Thomas Hancock & J. H. Leaman.
Machine for Cleaning & Separating Wheat.
N° 73803
PATENTED
JAN 28 1868
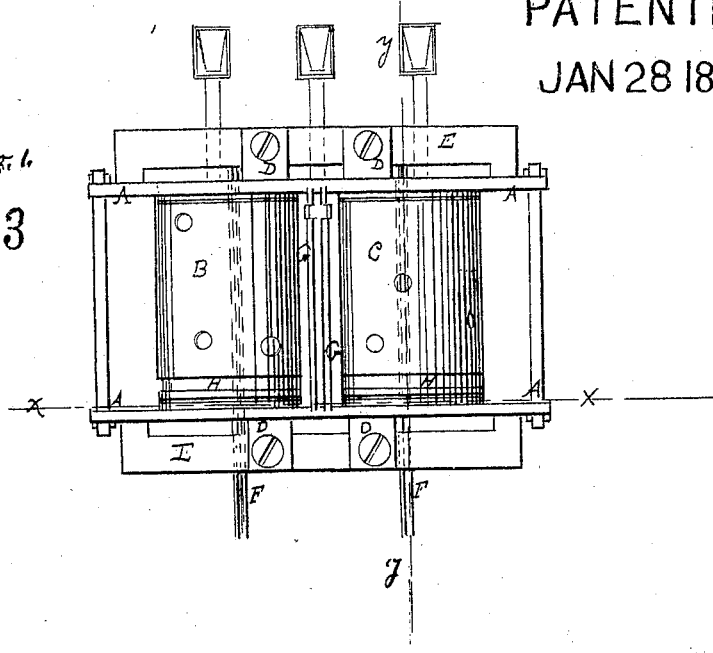
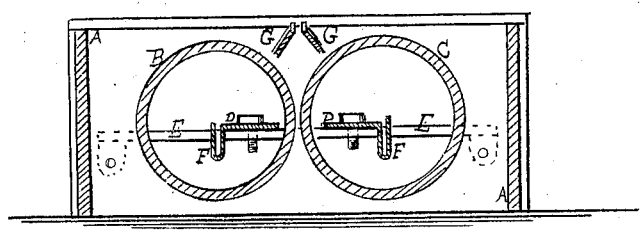
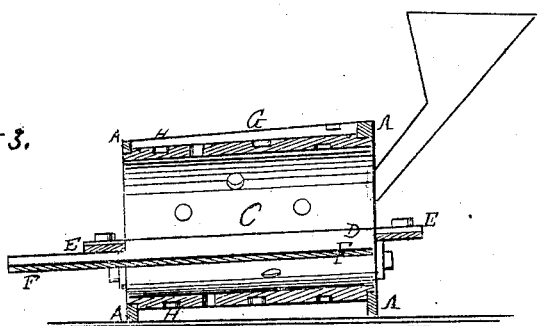
Witnesses.
Theo Tusche
Wm Trewin
Inventor:
Thos Hancock
J. H. Leaman
Per Mumn & Co
Attorneys

United States Patent Office.

THOMAS HANCOCK AND JOHN H. LEAMAN, OF RICHMOND, VIRGINIA.

Letters Patent No. 73,803, dated January 28, 1868.

IMPROVEMENT IN MACHINE FOR CLEANING GRAIN.

The Schedule referred to in these Letters Patent and making part of the same.

TO ALL WHOM IT MAY CONCERN:

Be it known that we, THOMAS HANCOCK and JOHN H. LEAMAN, of Richmond, in the county of Henrico, and State of Virginia, have invented a new and improved Machine for Cleaning and Separating Wheat; and we do hereby declare that the following is a full, clear, and exact description thereof, which will enable others skilled in the art to make and use the same, reference being had to the accompanying drawings, forming part of this specification, in which—

Figure 1 is a top view of our improved machine.

Figure 2 is a vertical section of the same, taken through the line $x$ $x$, fig. 1.

Figure 3 is a vertical section of the same, taken through the line $y$ $y$, fig. 1.

Similar letters of reference indicate like parts.

Our invention has for its object to furnish an improved machine by means of which cockle-seed, onion-seed, partridge-peas, &c., may be separated from the wheat conveniently; and it consists in the combination of the rollers or cylinders, having small holes or cavities formed through or partially through them, and having spaces or channels formed in their outer surfaces, in the combination of the bars and spouts with the interior of the cylinders, and in the combination of the inclined bars with the exterior of the cylinders; the whole being constructed and arranged as hereinafter more fully described.

A is the frame, in bearings in which the cylinders B and C revolve. B and C are hollow cylinders, which are pivoted to the frame A, in such an inclined position that the wheat will move freely through their interior, or through the space above and between the said cylinders, being fed by separate hoppers, one for each cylinder, and one for said space above the cylinder, as shown in red lines in the drawing. The rollers B and C are made to revolve in opposite directions, by any ordinary gearing, driven by any desired power. Upon the inner or outer surface of the cylinders, or upon both the inner and outer surfaces, are formed small cavities or holes, as seen in figs. 1 and 2; or, if desired, the cavities or holes may be deepened, so as to pass through the walls of the said cylinders. D are bars or plates attached to bars or supports E, secured to the frame A, and having spouts F formed upon or attached to their edges, which are towards the axes of the cylinders. G are guard-plates, the ends of which are placed in grooves formed in the frame A, in such a direction that the planes of the plates G may be nearly at right angles to the tangents of the cylinders at the points where the planes of the plates would intersect the cylinders. H are shallow grooves or spaces, formed around the lower ends of the cylinders, as shown in figs. 1 and 3. As the wheat is passing through the cylinders, the fine seeds that are to be separated from the wheat enter the holes or cavities in their interior surfaces, and are carried up between the outer edge of the box and sides of the cylinders, by the revolution of said cylinders, which revolve in opposite directions, as indicated by the arrows, the bars D pushing back any kernels of wheat that may be carried up by said cavities, the fine seeds falling upon the upper surface of the said bars D, and passing out of the machine through the spouts F. As the wheat passes through the space above and between the rollers B and C, the small seeds are carried up by the cavities in the outer surface of the said cylinders, and are discharged from the machine, or they may escape through the grooves H, the guard-plates G preventing the passage of the kernels of wheat. The present invention is not designed to be attached to a separator or threshing-machine.

What we claim as new, and desire to secure by Letters Patent, is—

1. The combination of the hollow rollers or cylinders B and C, having small holes or cavities formed through or partly through their walls, with each other, and with the frame in which they work, substantially as herein shown and described, and for the purpose set forth.

2. The combination of the bars D and spouts F with the interior of the hollow cylinders B and C, substantially as herein shown and described, and for the purpose set forth.

3. The combination of the guard-plates or bar G with the exterior of the cylinders B and C, substantially as herein shown and described, and for the purpose set forth.

4. Forming shallow grooves H around the lower ends of the cylinders B and C, for the escape of the fine seed, substantially as herein shown and described.

THOMAS HANCOCK,
JOHN H. LEAMAN.

Witnesses:
Jos. P. HEATH,
JOHN J. DAVIS.